(12) United States Patent
Kodama et al.

(10) Patent No.: US 7,114,761 B2
(45) Date of Patent: Oct. 3, 2006

(54) DOOR VISOR FOR VEHICLE

(75) Inventors: Katsunori Kodama, Niiza (JP); Hiroshi Takakura, Niiza (JP); Daisuke Watanabe, Niiza (JP); Tadao Motohashi, Niiza (JP)

(73) Assignee: Honda Access Corporation, Niiza (JP)

( * ) Notice: Subject to any disclaimer, the term of this patent is extended or adjusted under 35 U.S.C. 154(b) by 0 days.

(21) Appl. No.: 11/197,435

(22) Filed: Aug. 5, 2005

(65) Prior Publication Data

US 2006/0049663 A1 Mar. 9, 2006

(30) Foreign Application Priority Data

Sep. 6, 2004 (JP) ............... 2004-258324

(51) Int. Cl.
*B60J 1/20* (2006.01)
(52) U.S. Cl. ..................... 296/152; 454/131
(58) Field of Classification Search ........... 296/152, 296/154; 454/131, 132, 133
See application file for complete search history.

(56) References Cited

U.S. PATENT DOCUMENTS

| 2,575,933 | A | * | 11/1951 | Thorne ............... 296/152 |
| 2,859,680 | A | * | 11/1958 | Edward ............... 454/133 |
| 4,558,633 | A | * | 12/1985 | Lingg ................. 296/152 |
| 5,797,645 | A | * | 8/1998 | Schenk et al. ........ 296/152 |
| 6,877,792 | B1 | * | 4/2005 | Kanie et al. .......... 296/152 |

FOREIGN PATENT DOCUMENTS

JP 3091536 11/2002

* cited by examiner

*Primary Examiner*—Jason Morrow
(74) *Attorney, Agent, or Firm*—Westerman, Hattori, Daniels & Adrian, LLP.

(57) ABSTRACT

A door visor for a vehicle comprising a visor portion which extends from the front end of a window sash of the vehicle to the rear end of the window sash, and protrudes outward and downward of the vehicle from the top end of the window sash of the vehicle, a protrusion body extending in the vertical direction of the visor portion and protruding toward the vehicle from the inner surface of the visor portion, and provided approximately in parallel to the vertical direction of the rear end of the window sash and the vertical direction of the rear end of a window glass.

7 Claims, 4 Drawing Sheets

(a)

(b)

(a)

(b)

US 7,114,761 B2

DOOR VISOR FOR VEHICLE

BACKGROUND OF THE INVENTION

1. Field of the Invention

The present invention relates to a door visor for a vehicle including a visor portion which extends from the front end of a window sash of the vehicle to the rear end of the window sash, and protrudes outward and downward of the vehicle from the top end of the window sash of the vehicle.

2. Description of the Related Art

Conventionally, a door visor for a vehicle serves to encourage the indoor ventilation through a window as the vehicle runs with a window glass be slightly lowered, and serves as a cover against rain to prevent the entrance of the rain through the lowered window. There is, however, a problem that the door visor is likely to be the source of generating a wind roar. That is, the visor plate portion of the vehicular door visor has the front leaning lower than the back, and serves to form a negative pressure on the back side with the strong resistance of the wind received on the front surface, thereby positively evacuating the air in the vehicle by that negative pressure. However, because the front surface strongly receives the resistance of the wind, the wind roar is so likely to be generated. Particularly, a loud wind roar is likely to be generated at the front end of the visor plate portion, and, it is believed that the generation of the loud wind is caused by the air which strongly flows through the narrow space between the front end of the visor plate portion projecting laterally outward and the outer surface of the door mirror base or the fixed quarter window. As a conventional solution to this shortcoming, there is a door visor for a vehicle which prevents the generation of the wind roar by blocking the space between the front end of the visor plate portion whose front leans lower than the back, and the outer surface of the door mirror base or the fixed quarter window. This door visor is disclosed in Japanese Registered Utility Model Publication No. 3091536.

While the above-described conventional technology blocks the space between the front end of the visor plate portion whose front leans lower than the back, and the outer surface of the door mirror base or the fixed quarter window so as to prevent the generation of the wind roar, however, it cannot certainly prevent the generation of the wind roar which is generated from the door visor during driving of the vehicle.

The present invention has been made in view of the above-described circumstance. It is an object of the present invention to provide a door visor for a vehicle which can certainly prevent the generation of the wind roar generated from the door visor while the vehicle is running.

SUMMARY OF THE INVENTION

To achieve the above object, according to the first aspect of the present invention, there is provided a door visor for a vehicle comprising: a visor portion which extends from a front end of a window sash of the vehicle to a rear end of the window sash, and protrudes outward and downward of the vehicle from a top end of the window sash; and a protrusion body extending in a vertical direction of the visor portion and protruding toward the vehicle from an inner surface of the visor portion, and provided approximately in parallel to a vertical direction of the rear end of the window and a vertical direction of a rear end of a window glass.

The door visor of the first aspect blocks the wind which is generated during driving and passes through a bump or a recess portion formed between the window sash and the window glass, and the wind which is generated during driving and passes through between the window sash and the visor portion, thereby suppressing the generation of the wind roar originated from those winds.

In the above-described vehicular door visor, the protrusion body may be so formed as to divide the visor portion into a front and a rear portion.

An outer surface of the window sash and an outer surface of the window may be so structured as to be approximately in parallel to each other, and the protrusion body may be provided on a window-glass side.

An outer surface of the window sash may be so structured as to protrude outward of the vehicle relative to an outer surface of the window glass, and the protrusion body may be provided on a window-sash side.

The protrusion body may comprise a protrusion which extends in the vertical direction of the visor portion and protrudes toward the vehicle from the inner surface of the visor portion, and a foam rubber which is formed on a tip of the protrusion in such a manner as to contact the window sash and divide the visor portion into a front and a rear portion.

BRIEF DESCRIPTION OF THE DRAWINGS

The object, other objects, and advantages of the present invention will be more apparent upon reading of the following detailed description together with the accompanying drawings in which.

DETAILED DESCRIPTION OF THE PREFERRED EMBODIMENTS

Figure 1:
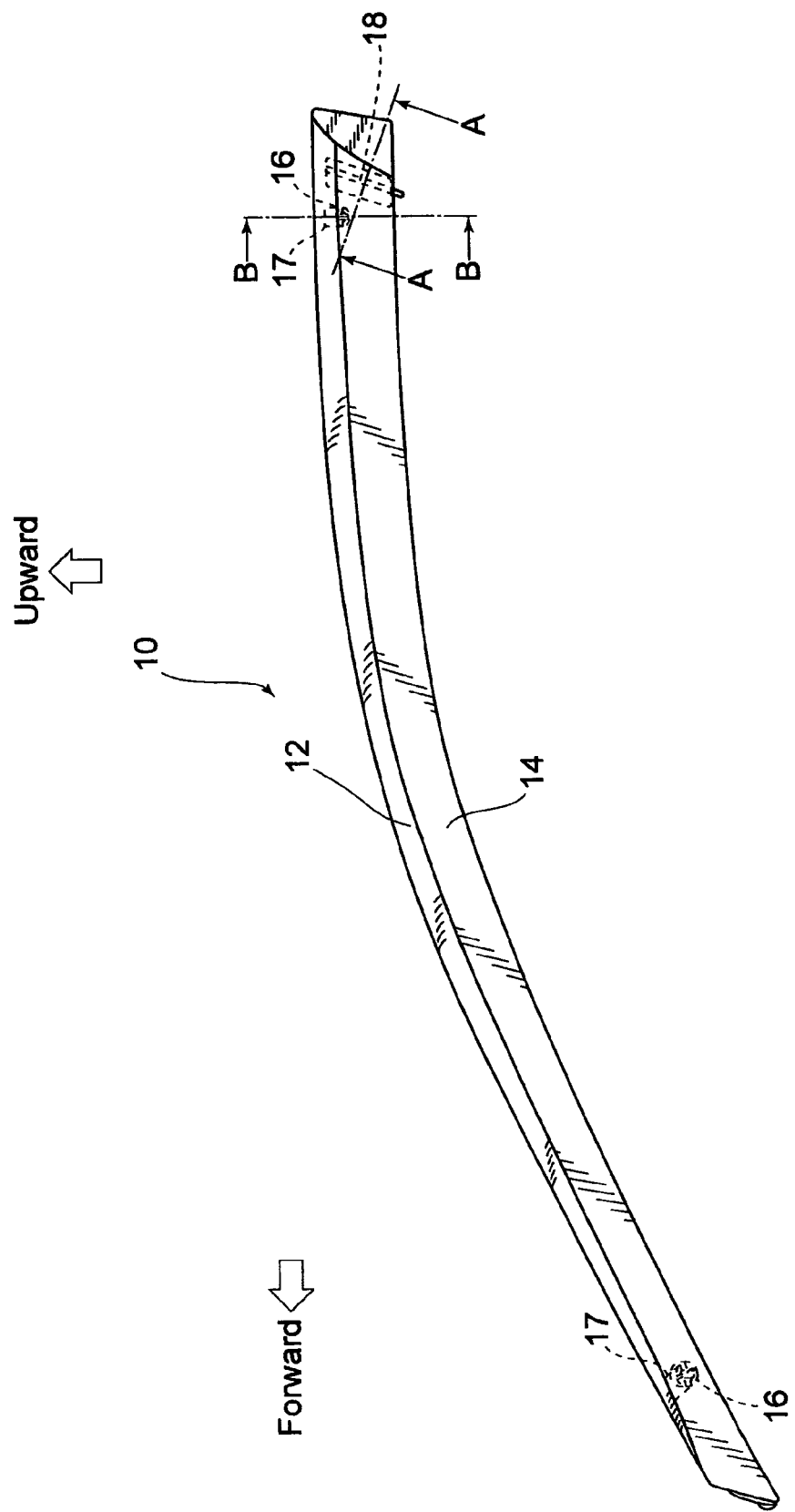
FIG. 1 is a diagram illustrating a door visor for a vehicle according to the first embodiment of the invention.
Figure 2:
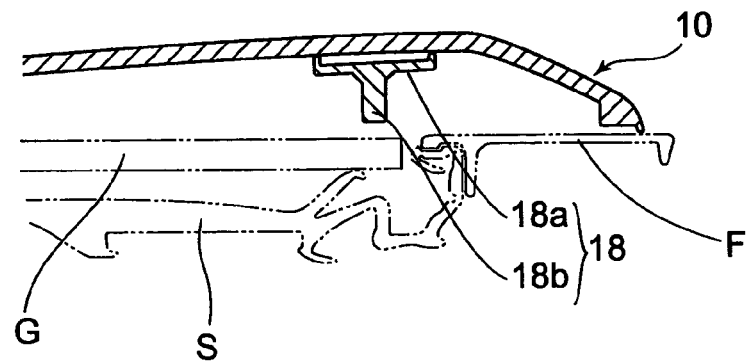
FIG. 2A is a partially sectional view of the vehicular door visor in FIG. 1.
FIG. 2B is a partially sectional view of the vehicular door visor in FIG. 1.
Figure 2:
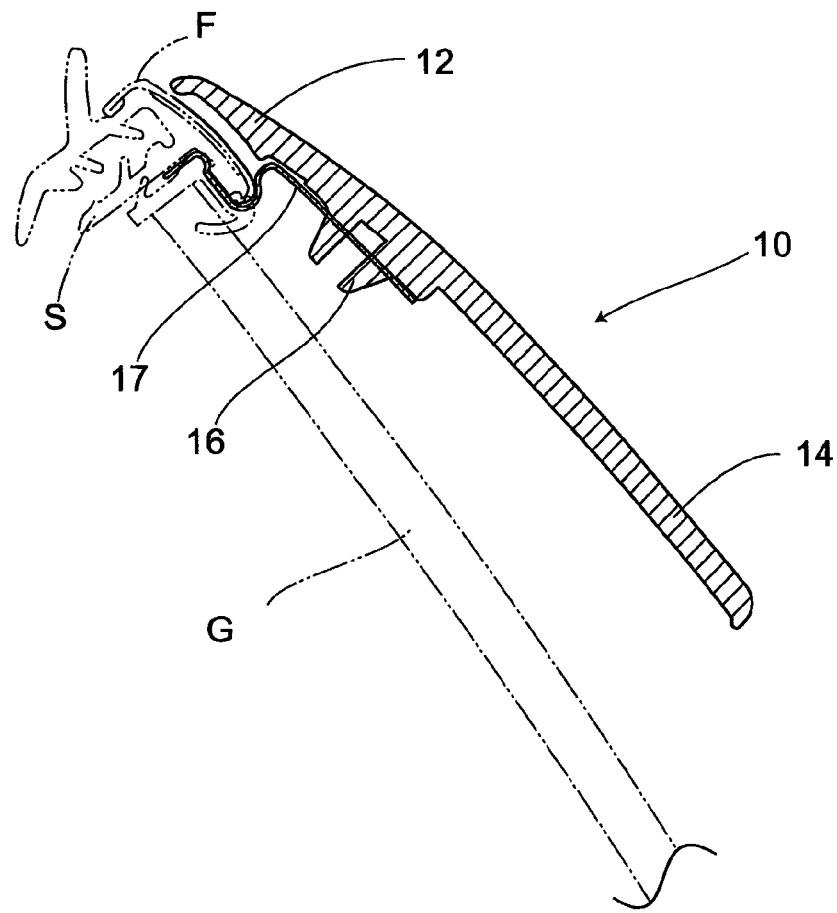

Preferred embodiments of a door visor for a vehicle according to the invention will now be explained with reference to the accompanying drawings. FIGS. 1 and 2 are diagrams illustrating the first embodiment of the door visor for a vehicle according to the present invention.

FIG. 1 is a diagram illustrating a vehicular door visor 10 of the first embodiment. FIG. 2A is a cross-sectional view along the line A—A in FIG. 1, and FIG. 2B is a cross-sectional view along the line B—B in FIG. 1. The vehicular door visor 10 is so formed as to have an approximately arcuate planar shape along the shape of the top end of a window sash F extending from the front end thereof to the rear end thereof, at the front door of the vehicle. The vehicular door visor 10 is also formed in an approximately arc shape with approximately the same thickness in the vertical direction in such a manner as to protrude outward of the vehicle. The vehicular door visor 10 has a fixation portion 12 which is, for instance, fixed to the upper end of the window sash F of the vehicle by a double-sided tape, and a visor portion 14 which protrudes outward of the vehicle. Both front and rear ends of the door visor 10 are so formed as to extend toward the vehicle. The front and the rear portions of the inner surface of the vehicular door visor 10 are respectively formed with conical protrusions 16, 16 with trapezoid cross-sectional shapes, each protruding like a cone. The conical protrusions 16, 16 are respectively provided with brackets 17, 17 for the fixation of the vehicular door visor 10 along with the double-sided tape. One end of each bracket 17 is fitted into the associated conical protrusion 16, and the other end of the bracket 17 is fitted into the window sash F. The rear portion of the door visor 10 is formed with a protrusion body 18 of a letter T shape in side cross section, and the protrusion body 18 includes a bottom portion 18*a* of an approximately rectangular shape, which is adhered to the inner surface of the vehicular door visor 10, and a protrusion 18*b* which protrudes outward of the vehicle from the approximate center of the bottom portion 18*a* in the longitudinal direction. The protrusion body 18 is arranged in front of the rear end surface of a window glass G by a predetermined distance from that rear end surface. In this case, it is preferable that the protrusion body 18 should be provided on a portion adjacent to the upper portion of the rear end surface of the window glass G and 2 to 3 mm away from the front portion of the rear end of the window sash F. The window glass G and the window sash F are sealed by a sealer S.

According to the embodiment, the drive wind, which passes through a bump or a recess portion formed between the window sash F and the window glass G, and the drive wind, which passes through between the window sash F and the visor portion 14, are substantially blocked. This can suppress the generation of the wind roar originated from such a wind.

Figure 3:
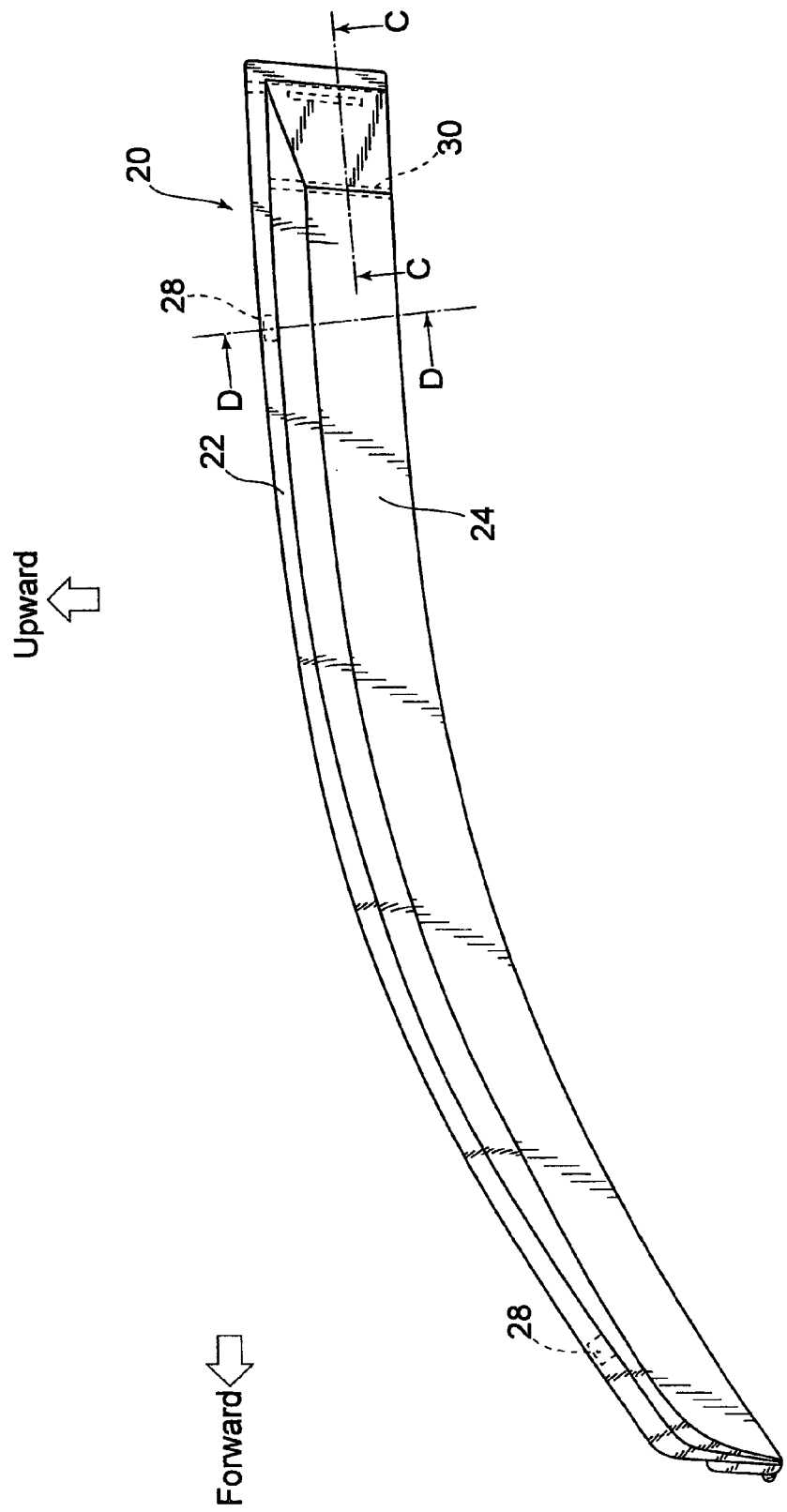
FIG. 3 is a diagram illustrating a door visor for a vehicle according to the second embodiment of the invention.
Figure 4:
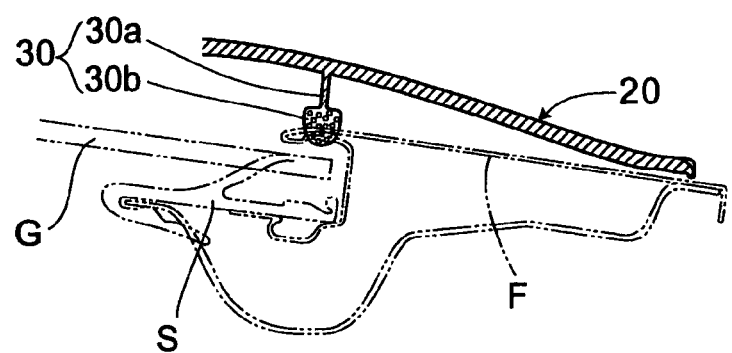
FIG. 4 is a partially sectional view of the door visor in FIG. 3.
Figure 4:
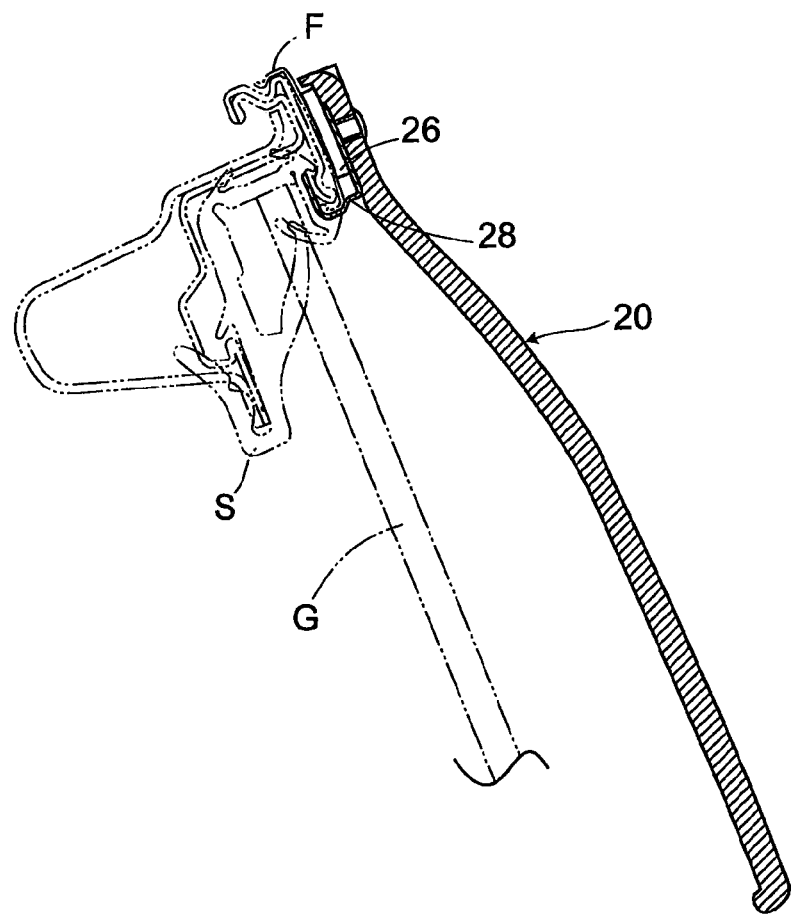

Next, the second embodiment of a door visor for a vehicle according to the present invention will now be explained. FIGS. 3 and 4 are diagrams illustrating the second embodiment of the door visor for a vehicle according to the present invention. The same reference numbers will denote the same structure portions as those of the first embodiment, thereby omitting the detailed explanations in the embodiment.

FIG. 3 is a diagram illustrating a vehicular door visor 20 of the second embodiment. FIG. 4A is a cross-sectional view along the line C—C in FIG. 3, and FIG. 4B is a cross-sectional view along the line D—D in FIG. 3. The vehicular door visor 20 is so formed as to have an approximately arcuate planar shape along the shape of the top end of a window sash F extending from the front end thereof to the rear end thereof, at the front door of the vehicle. The vehicular door visor 20 for the vehicle is also formed in an approximately arc shape with approximately the same thickness in the vertical direction in such a manner as to protrude outward of the vehicle. The vehicular door visor 20 has a fixation portion 22 which is, for instance, fixed to the upper end of the window sash F of the vehicle by a double-sided tape, and a visor portion 24 which protrudes outward of the vehicle. Both front and rear ends of the vehicular door visor 20 are so formed as to extend toward the vehicle. The front and the rear portions of the vehicular door visor 20 are respectively provided with attachment portions 26, 26 for fixing the door visor 20 for the vehicle to the window sash F. The attachment portions 26, 26 are respectively provided with brackets 28, 28 for the fixation of the vehicular door visor 20 along with the double-sided tape. One end of each bracket 28 is attached to the associated attachment portion 26, and the other end of the bracket 28 is fitted into the window sash F. The rear portion of the vehicular door visor 20 is provided with a protrusion body 30, and the protrusion body 30 includes a protrusion 30*a* which extends in the vertical direction of the inner surface of the door visor 20 for the vehicle and protrudes from the inner surface of the door visor 20 for the vehicle, and a foam rubber (EPT SEALER (registered trademark)) 30*b* which is foamed on the tip of the protrusion 30*a* in such a manner as to contact the window sash F and divide the visor portion 24 into a front and a rear portion.

According to the embodiment, the wind roar due to the wind which is generated during driving can be suppressed by the blocking of that wind.

The invention is not limited to the above-described embodiments, various modifications can be carried out with the scope of the present invention.

What is claimed is:

1. A door visor for a vehicle comprising:
a visor portion which extends from a front end of a window sash of said vehicle to a rear end of said window sash, and protrudes outward and downward of said vehicle from a top end of said window sash; and
a protrusion body extending in a vertical direction of said visor portion and protruding toward said vehicle from an inner surface of said visor portion, and provided approximately in parallel to a vertical direction of said rear end of said window and a vertical direction of a rear end of a window glass,
wherein said protrusion body blocks a wind which is generated during driving and passes through a bump or a recess portion formed between said window sash and said window glass, and a wind which is generated during driving and passes through between said window sash and said visor portion in such a manner as to suppress a generation of wind roar originated from said winds.

2. The door visor according to claim 1,
wherein said protrusion body is so formed as to divide said visor portion into a front and a rear portion.

3. The door visor according to claim 1,
wherein an outer surface of said window sash and an outer surface of said window are so structured as to be approximately in parallel to each other, and said protrusion body is provided on a window-glass side.

4. The door visor according to claim 2,
wherein an outer surface of said window sash and an outer surface of said window are so structured as to be approximately in parallel to each other, and said protrusion body is provided on a window-glass side.

5. The door visor according to claim 1,
wherein an outer surface of said window sash is so structured as to protrude outward of said vehicle relative to an outer surface of said window glass, and said protrusion body is provided on a window-sash side.

6. The door visor according to claim 2, wherein
an outer surface of said, window sash is so structured as to protrude outward of said vehicle relative to an outer surface of said window glass, and said protrusion body is provided on a window-sash side.

7. A door visor for a vehicle comprising:
a visor portion which extends from a front end of a window sash of said vehicle to a rear end of said window sash, and protrudes outward and downward of said vehicle from a top end of said window sash; and
a protrusion body extending in a vertical direction of said visor portion and protruding toward said vehicle from an inner surface of said visor portion and provided approximately in parallel to a vertical direction of said rear end of said window and a vertical direction of a rear end of a window glass, wherein said protrusion body comprises a protrusion which extends in said vertical direction of said visor portion and protrudes toward said vehicle from said inner surface of said visor portion, and a foam rubber which is formed on a tip of said protrusion in such a manner as to contact said window sash and divide said visor portion into a front and a rear portion.

* * * * *